A golf ball which has excellent abrasion-resistance and spin performance is provided. The golf ball of the present invention includes a core and a cover covering the core and containing polyurethane as a resin component, wherein the polyurethane has, as a constituting component, a polyisocyanate component, a high-molecular weight polyol component, and a mixture of cis-1,4-cyclohexane dimethanol and trans-1,4-cyclohexane dimethanol as a chain extender.

21 Claims, 1 Drawing Sheet

GOLF BALL

FIELD OF THE INVENTION

The present invention relates to a technology for improving a cover, especially a technology for improving a urethane cover.

DESCRIPTION OF THE RELATED ART

As a resin component constituting a cover of a golf ball, an ionomer resin or polyurethane is used. Covers containing an ionomer resin are widely used for their excellent repulsion, durability and processability. However, the problems have been pointed out that the shot feeling is poor because of the high rigidity and hardness and that the controllability is also poor because of the insufficient spin performance. On the other hand, if polyurethane is used as the resin component, it is known that the shot feeling and spin performance are improved compared with an ionomer resin.

JP2005-523958T discloses a golf ball comprising a core and a cover, the cover comprising a polyurethane elastomer, the polyurethane elastomer comprising the reaction product of (a) a HDI-terminated prepolymer comprising the reaction product of one or more polyols with a stoichiometric excess of HDI diisocyanate monomer wherein unreacted HDI diisocyanate monomer is removed to less than about 2 wt. % and (b) at least one hydroxy or amine functional chain extender.

JP2008-195955A discloses a golf ball comprising a core and a cover, the cover comprising a polyurethane elastomer, the polyurethane elastomer comprising the reaction product of (a) a HDI-terminated prepolymer comprising the reaction product of one or more polyols selected from the group consisting of polyesters, polycaprolactones, polyethers, polycarbonates, and hydrocabon polyols with a stoichiometric excess of HDI diisocyanate monomer and prepared without using a solvent wherein unreacted HDI diisocyanate monomer is removed to less than about 2 wt. % and (b) at least one hydroxy or amine functional chain extender.

JP2007-90065A discloses a golf ball comprising a core and one more cover layer which encloses the core, the ball being characterized in that at least one cover layer is made primarily of a thermoplastic polyurethane elastomer obtained by a curing reaction of an original polyurethane liquid containing a polyol component and a polyisocyanate component, wherein the polyol component includes a copolymeric polycarbonate polyol.

JP2005-28153A discloses a multilayer golf ball formed, at least in part, from a polyurethane or polyurea composition. The polyurethane or polyurea composition may include at least one diisocyanate, at least one polyol(polyurethane) or amine-terminated moiety(polyurea), and at least one curing agent.

SUMMARY OF THE INVENTION

In general, golf balls having a soft cover are excellent in the spin performance, but the abrasion-resistance is poor, while golf balls having a hard cover are excellent in the abrasion-resistance, but the spin performance is poor. That is, the spin performance and the abrasion-resistance are contradictory properties, and it is required to strike a balance between the spin performance and the abrasion-resistance. The present invention has been made in view of the above circumstances, and an object of the present invention is to provide a golf ball having an excellent abrasion-resistance and spin performance in a golf ball using a polyurethane cover.

The present invention which has solved the above problems provides a golf ball comprising: a core; and a cover covering the core and containing polyurethane as a resin component, wherein the polyurethane has, as a constituting component, a polyisocyanate component, a high-molecular weight polyol component, and a mixture of cis-1,4-cyclohexane dimethanol and trans-1,4-cyclohexane dimethanol as a chain extender. As a result of the aggressive research by the present inventors, the present inventors have achieved the present invention based on the finding that the use of a mixture of cis-1,4-cyclohexane dimethanol and trans-1,4-cyclohexane dimethanol as a chain extender provides the golf ball with the abrasion-resistance and spin performance which are well-balanced. The mixing ratio (cis/trans) of cis-1,4-cyclohexane dimethanol and trans-1,4-cyclohexane dimethanol preferably ranges from 10/90 to 70/30 in a mass ratio. If the mixing ratio falls within the above range, it is possible to strike a balance between the abrasion-resistance and the spin performance at the higher level.

The present invention provides a golf ball which has the excellent abrasion-resistance and spin performance in a golf ball with a cover using a polyurethane as a resin component.

DESCRIPTION OF THE PREFERRED EMBODIMENT

The present invention is directed to a golf ball comprising: a core; and a cover covering the core and containing polyurethane as a resin component, wherein the polyurethane has, as a constituting component, a polyisocyanate component, a high-molecular weight polyol component, and a mixture of cis-1,4-cyclohexane dimethanol and trans-1,4-cyclohexane dimethanol (hereinafter, sometimes may be referred to as "cis-trans mixture") as a chain extender.

First, the polyurethane used in the present invention will be explained. The polyurethane is not limited, as long as the polyurethane is obtained by a reaction of polyisocyanate, the high-molecular weight polyol, and the cis-trans mixture as a chain extender, which are constituting components. The polyurethane may be a thermoplastic polyurethane or a thermosetting polyurethane. In the following, each of the components will be explained.

In the present invention, the mixture of cis-1,4-cyclohexane dimethanol and trans-1,4-cyclohexane dimethanol is used as the chain extender. The balance between the abrasion-resistance and the spin performance can be struck by using the mixture of cis-compound and trans-compound.

The mixing ratio (cis/trans) is preferably 70/30 or less, more preferably 60/40 or less, even more preferably 50/50 or less, and is preferably 10/90 or more, more preferably 20/80 or more, even more preferably 30/70 or more, in a mass ratio. If the mixing ratio falls within the above range, the balance between the abrasion-resistance and the spin performance can be struck at the higher level.

The cis-trans mixture can be obtained by mixing 1,4-cyclohexane dimethanol (a mixture of cis-compound and trans-compound, cis content: 74 mass %) and trans-1,4-cyclohexane dimethanol (trans content: 100 mass %), available from TOKYO CHEMICAL INDUSTRY Co., Ltd, in a desired mixing ratio.

Although the polyurethane used in the present invention preferably contains only the cis-trans mixture of cyclohexane dimethanol as a chain extender, other chain extenders may be used as a constituting component to the extent that the effect of the present invention is not impaired. Other chain extenders include a low-molecular weight polyol or a low-molecular weight polyamine. Examples of the low-molecular weight polyol may include a diol such as ethylene glycol, diethylene glycol, triethylene glycol, propanediol (e.g., 1,2-propanediol, 1,3-propanediol, and 2-methyl-1,3-propanediol), dipropylene glycol, butanediol (e.g., 1,2-butanediol, 1,3-butanediol, 1,4-butanediol, 2,3-butanediol, and 2,3-dimethyl-2,3-butanediol), neopentyl glycol, pentanediol, hexanediol, heptanediol, octanediol, an aniline diol, and a bisphenol A diol; a triol such as glycerin, trimethylol propane, and hexanetriol; a tetraol or a hexanol such as pentaerythritol and sorbitol.

The low-molecular weight polyamine that can be used as a chain extender may include any polyamine, as long as it has at least two amino groups. The polyamine includes an aliphatic polyamine such as ethylenediamine, propylenediamine, butylenediamine, and hexamethylenediamine, an alicyclic polyamine such as isophoronediamine, piperazine, and an aromatic polyamine.

The aromatic polyamine has no limitation as long as it has at least two amino groups directly or indirectly bonded to an aromatic ring. Herein, the "indirectly bonded to the aromatic ring", for example, means that the amino group is bonded to the aromatic ring via a lower alkylene bond. Further, the aromatic polyamine includes, for example, a monocyclic aromatic polyamine having at least two amino groups bonded to one aromatic ring or a polycyclic aromatic polyamine having at least two aminophenyl groups each having at least one amino group bonded to one aromatic ring.

Examples of the monocyclic aromatic polyamine include a type such as phenylenediamine, tolylenediamine, diethyltoluenediamine, and dimethylthiotoluenediamine wherein amino groups are directly bonded to an aromatic ring; and a type such as xylylenediamine wherein amino groups are bonded to an aromatic ring via a lower alkylene group. Further, the polycyclic aromatic polyamine may include a poly (aminobenzene) having at least two aminophenyl groups directly bonded to each other or a compound having at least two aminophenyl groups bonded via a lower alkylene group or an alkylene oxide group. Among them, a diaminodiphenylalkane having two aminophenyl groups bonded to each other via a lower alkylene group is preferable. Typically preferred are 4,4'-diaminodiphenylmethane or the derivatives thereof.

The other chain extender preferably has a molecular weight of 400 or less, more preferably 350 or less, even more preferably 300 or less and preferably has a molecular weight of 30 or more, more preferably 40 or more, even more preferably 45 or more. If the molecular weight is too large, it is difficult to distinguish the chain extender from the high-molecular weight polyol constituting a soft segment of the polyurethane.

The polyisocyanate component constituting the polyurethane used in the present invention is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). These may be used either alone or as a mixture of at least two of them.

In view of improving the abrasion-resistance, the aromatic polyisocyanate is preferably used as the polyisocyanate component of the polyurethane. Use of the aromatic polyisocyanate improves the mechanical property of the obtained polyurethane and provides the cover with the excellent abrasion-resistance. In addition, in view of improving the weather resistance, as the polyisocyanate component of the polyurethane, a non-yellowing type polyisocyanate such as TMXDI, XDI, HDI, $H_6XDI$, IPDI, $H_{12}MDI$ and NBDI is preferably used. More preferably, 4,4'-dicyclohexylmethane diisocyanate ($H_{12}MDI$) is used. Since 4,4'-dicyclohexylmethane diisocyanate ($H_{12}MDI$) has a rigid structure, the mechanical property of the resulting polyurethane is improved, and thus the cover which is excellent in abrasion-resistance can be obtained.

The high-molecular polyol component constituting the polyurethane is not limited, as long as it has a plurality of hydroxyl groups. Such examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; and an acrylic polyol. The above polyols may be used alone or as a mixture of at least two of them. Among them, as a high-molecular weight polyol, a high molecular weight diol is preferably used.

A number average molecular weight of the high-molecular weight polyol is not particularly limited, and for example, it is preferably more than 400, more preferably 800 or more, even more preferably 1,000 or more. If the number average molecular weight of the high-molecular weight polyol is too small, the resultant polyurethane becomes too hard and the shot feeling of the golf ball is lowered. The upper limit of the number average molecular weight of the high-molecular weight polyol is not particularly limited, and it is preferably 10,000, more preferably 8,000. The number average molecular weight of the polyol component can be measured by Gel permeation Chromatography using two columns of TSK-GEL SUPREH 2500 (TOSOH Corporation) as a column, polystyrene as a standard material, and tetrahydrofuran as an eluate.

The high-molecular weight polyol preferably has a hydroxyl value of 500 mgKOH/g or less, more preferably 250 mgKOH/g or less, even more preferably 100 mgKOH/g or less. The hydroxyl value of the high-molecular weight polyol can be measured for example, by an acetylation method according to JIS K1557-1.

The polyurethane preferably has a slab hardness of 15 or more, more preferably 20 or more, and preferably has a slab hardness of 50 or less, more preferably 45 or less, even more preferably 42 or less in Shore D hardness. If the slab hardness is too low, the spin rate may increase on the driver shot, while if the slab hardness is too high, the spin rate may decrease on the approach shot.

The polyurethane has no limitation on the constitutional embodiments thereof. Examples of the constitutional embodiments are the embodiment where the polyurethane consists of the polyisocyanate component, the high-molecular weight polyol component and the cis-trans mixture as the chain extender; and the embodiment where the polyurethane consists of the polyisocyanate component, the high-molecular weight polyol component, the cis-trans mixture and other chain extenders as the chain extender.

The polyurethane may be either thermoplastic polyurethane or thermosetting polyurethane. The thermoplastic polyurethane is polyurethane exhibiting plasticity by heating and generally means polyurethane having a straight chain structure of a high molecular weight to a certain extent. On the other hand, the thermosetting polyurethane (two-component curing type polyurethane) is polyurethane obtained by temporarily preserving a low-molecular weight urethane prepolymer, and reacting the prepolymer with a chain extender (curing agent) to increase a molecular weight thereof immediately before molding the cover. The thermosetting polyurethane includes polyurethane having a straight chain structure or polyurethane having a three-dimensional crosslinked structure depending on a number of a functional group of the prepolymer or the chain extender (curing agent) to be used. In the present invention, the thermoplastic polyurethane is preferable.

Examples of a method for synthesizing the polyurethane include a one-shot method and a prepolymer method. The one-shot method is a method of reacting a polyisocyanate component, a polyol component or the like at once. The prepolymer method is a method of reacting a polyisocyanate component and a polyol component or the like in multiple steps. For example, a low-molecular-weight urethane prepolymer is synthesized, and subsequently the urethane prepolymer is polymerized to have a high-molecular weight. The polyurethane used in the present invention is preferably produced by the prepolymer method.

As an example of producing the polyurethane by the prepolymer method, the following case will be described in detail, wherein an isocyanate group terminated urethane prepolymer is synthesized and then polymerized with the cis-trans mixture as the chain extender.

First, a polyisocyanate component is subjected to a urethane reaction with a high-molecular weight polyol component to synthesize an isocyanate group terminated urethane prepolymer. In this case, the charging ratio of the polyisocyanate component to the high-molecular weight polyol component is, preferably 1 or larger, more preferably 1.2 or larger, and even more preferably 1.5 or larger, and is preferably 10 or smaller, more preferably 9 or smaller, and even more preferably 8 or smaller in a molar ratio (NCO/OH) of the isocyanate group (NCO) contained in the polyisocyanate component to the hydroxyl group (OH) contained in the polyol component.

The temperature at which the prepolymer reaction is performed is preferably 10° C. or higher, more preferably 30° C. or higher, and even more preferably 50° C. or higher, and is preferably 200° C. or lower, more preferably 150° C. or lower, and even more preferably 100° C. or lower. The reaction time for the prepolymer reaction is preferably 10 minutes or longer, more preferably 1 hour or longer, and even more preferably 3 hours or longer, and is preferably 32 hours or shorter, more preferably 16 hours or shorter, and even more preferably 8 hours or shorter.

Next, the obtained isocyanate group terminated urethane prepolymer is subjected to a chain extension reaction with the cis-trans mixture as a chain extender component to obtain the polyurethane. In this case, the charging ratio of the isocyanate group terminated urethane prepolymer to the chain extender component is preferably 0.9 or larger, more preferably 0.92 or larger, and even more preferably 0.95 or larger, and is preferably 1.1 or smaller, more preferably 1.08 or smaller, and even more preferably 1.05 or smaller in a molar ratio (NCO/OH) of the isocyanate group (NCO) contained in the isocyanate group terminated urethane prepolymer to the hydroxyl group (OH) contained in the chain extender component.

The temperature at which the chain extension reaction is performed is preferably 10° C. or higher, more preferably 30° C. or higher, and even more preferably 50° C. or higher, and preferably 220° C. or lower, more preferably 170° C. or lower, and even more preferably 120° C. or lower. The reaction time for the chain extension reaction is preferably 10 minutes or longer, more preferably 30 minutes or longer, and even more preferably 1 hour or longer, and preferably 20 days or shorter, more preferably 10 days or shorter, and even more preferably 5 days or shorter.

Both of the prepolymer reaction and the chain extension reaction are preferably conducted in an atmosphere of nitrogen.

In synthesizing the polyurethane, a known catalyst may be used as long as it does not impair the effect of the present invention. Examples of the catalyst include a monoamine such as triethylamine, and N,N-dimethylcyclohexylamine; a polyamine such as N,N,N',N'-tetramethylethylenediamine, and N,N,N',N'',N''-pentamethyldiethylenetriamine; a cyclic diamine such as 1,8-diazabicyclo-[5.4.0]-7-undecene (DBU), triethylenediamine; a tin-based catalyst such as dibutyl tin dilaurylate, and dibutyl tin diacetate. Each of these catalysts may be used solely, or two or more of these catalysts may be used in combination. Among these catalysts, a tin-based catalyst such as dibutyl tin dilaurylate, and dibutyl tin diacetate are preferable, and in particular, dibutyl tin dilaurylate is preferably used.

A mass ratio (cis/trans) of the cis-structure molecule to the trans structure molecule in 1,4-cyclohexane dimethanol constituting the synthesized polyurethane can be measured as follows. The polyurethane is subjected to a treatment with a DMF solution containing n-butylamine or a heat treatment to break urethane bonds in the polyurethane, and the resulting material is analyzed by gas chromatography, or other similar methods.

A concentration of n-butylamine in the DMF solution preferably ranges from 0.01 mol/l to 0.25 mol/l, and is more preferably 0.05 mol/l. The heat treatment is preferably performed, for example, at a temperature ranging from 130° C. to 150° C. for a time period ranging from 2 hours to 4 hours.

The cover of the present invention may contain other resin components in addition to the polyurethane as a resin component, as long as it does not impair the effect of the present invention. Examples of the other resin component include an ionomer resin, a thermoplastic elastomer, a diene block copolymer, or the like.

Examples of the ionomer resin include one prepared by neutralizing at least a part of carboxyl groups in a copolymer, composed of ethylene and α,β-unsaturated carboxylic acid having a carbon number of 3 to 8 with a metal ion; one prepared by neutralizing at least a part of carboxyl groups in a terpolymer composed of ethylene, α,β-unsaturated carboxylic acid having a carbon number of 3 to 8, and α,β-unsaturated carboxylic acid ester with a metal ion; or a mixture of these two. Examples of the α,β-unsaturated carboxylic acid include acrylic acid, methacrylic acid, fumaric acid, maleic acid, crotonic acid, or the like. In particular, acrylic acid and methacrylic acid are preferable. Examples of the α,β-unsaturated carboxylic acid ester include methyl ester, ethyl ester, propyl ester, n-butyl ester, isobutyl ester of acrylic acid, methacrylic acid, fumaric acid, and maleic acid. In particular, acrylic acid ester and methacrylic acid ester are preferable. Examples of the metal ion for neutralizing at least a part of the carboxyl groups in the copolymer composed of ethylene and the α,β-unsaturated carboxylic acid or in the terpolymer composed of ethylene, the α,β-unsaturated carboxylic acid, and the α,β-unsaturated carboxylic acid ester are; monovalent metal ions such as sodium, potassium, and lithium; divalent metal ions such as magnesium, calcium, zinc, barium, and cadmium; trivalent metal ions such as aluminum, or other metal ions such as tin and zirconium. In particular, sodium ion, zinc ion, and magnesium ion are preferably used in view of the resilience and durability of the golf ball.

Specific examples of the ionomer resin include "Himilan (registered trade mark)" available from MITSUI-DUPONT POLYCHEMICAL CO., LTD, "Surlyn (registered trade mark)" available from DUPONT CO, and "Iotek (registered trade mark)" available from Exxon Co.

Specific examples of the thermoplastic elastomer includes a thermoplastic polyamide elastomer having a commercial name of "PEBAX", for example, "PEBAX 2533", available from ARKEMA Inc; a thermoplastic polyester elastomer having a commercial name of "HYTREL", for example, "HYTREL 3548" and "HYTREL 4047" available from DU PONT-TORAY Co.; and a thermoplastic polystyrene elastomer having a commercial name of "Rabalon" available from Mitsubishi Chemical Co. Among them, the thermoplastic polystyrene elastomer is preferable. The thermoplastic polystyrene elastomer includes, for example, a polystyrene-diene block copolymer comprising a polystyrene block component as a hard segment and a diene block component, for example polybutadiene, isoprene, hydrogenated polybutadiene, hydrogenated polyisoprene, as a soft segment. The polystyrene-diene block copolymer comprises a double bond derived from a conjugated diene compound of block copolymer or partially hydrogenated block copolymer. Examples of the polystyrene-diene block copolymer are a block copolymer having a SBS (styrene-butadiene-styrene) comprising polybutadiene block; and a block copolymer having a SIS (styrene-isoprene-styrene) structure.

In the case that another resin component is used as the resin component for the cover of the present invention in addition the polyurethane, the resin component preferably contains the polyurethane as the main component. The resin component preferably contains the polyurethane in an amount of 50 mass % or higher, more preferably 60 mass % or higher, and even more preferably 70 mass % or higher. Further, it is also preferable that the resin component essentially consists of the polyurethane.

The cover of the golf ball of the present invention may contain a pigment component such as a white pigment (titanium oxide) and a blue pigment, a gravity adjusting agent such as calcium carbonate and barium sulfate, a dispersant, an antioxidant, an ultraviolet absorber, a light stabilizer, a fluorescent material or a fluorescent brightener, as long as the cover performance is not damaged.

The content of the white pigment (titanium oxide) is preferably 0.5 part by mass or more, more preferably 1 part by mass or more, and preferably 10 parts by mass or less, more preferably 8 parts by mass or less based on 100 parts by mass of the resin component constituting the cover. The white pigment in an amount of 0.5 part by mass or more can impart opacity to the cover, while the white pigment in an amount of more than 10 parts by mass may lower the durability of the resulting cover.

An embodiment for molding a cover is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). In the case of directly injection molding the cover composition onto the core, it is preferred to use upper and lower molds for forming a cover having a spherical cavity and pimples, wherein a part of the pimple also serves as a retractable hold pin. When forming the cover by injection molding, the hold pin is protruded to hold the core, and the cover composition which has been heated and melted is charged and then cooled to obtain a cover. For example, the cover composition heated and melted at the temperature of 150° C. to 230° C. is charged into a mold held under the pressure of 980 KPa to 1,500 KPa for 0.1 to 1 second. After cooling for 15 to 60 seconds, the mold is opened and the golf ball with the cover molded is taken out from the mold.

Molding of the half shell can be performed by either compression molding method or injection molding method, and the compression molding method is preferred. The compression-molding of the cover composition into half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of a method for molding the cover using half shells include compression molding by covering the core with two half shells. The compression molding of half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a cover for a golf ball having a uniform thickness can be formed.

When molding a cover, the concave portions called "dimple" are usually formed on the surface. After the cover is molded, the mold is opened and the golf ball body is taken out from the mold, and as necessary, the golf ball body is preferably subjected to surface treatment such as deburring, cleaning, and sandblast. If desired, a paint film or a mark may be formed.

The thickness of the cover of the golf ball of the present invention is not particularly limited; however, it is preferably 0.3 mm or more, more preferably 0.5 mm or more, and even more preferably 0.7 mm or more. If the thickness of the cover is too thin, the abrasion-resistance may be lowered. Also, the thickness of the cover is preferably 2.5 mm or less, more preferably 2.3 mm or less, and even more preferably 2.1 mm or less. If the thickness of the cover is too thick, the repulsion property may be lowered.

The cover composition preferably has the slab hardness of 20 or more, more preferably 22 or more, and even more preferably 24 or more, and preferably has the slab hardness of 50 or less, more preferably 48 or less in Shore D hardness. If the slab hardness of the cover is less than 20, the repulsion property of the golf ball may be lowered, resulting in shortening a flight distance, while if the cover hardness is more than 50, the durability of the obtained golf ball may be lowered. The slab hardness of the cover can be measured by molding the cover composition into a sheet with a thickness of about 2 mm by hot press molding, preserving the sheet at 23° C. for 2 weeks, stacking three or more of the preserved sheet on one another to avoid being affected by the measuring substrate on which the sheets are placed and carrying out the measurement of the stack by a Shore D type spring hardness tester prescribed by ASTM-D2240.

Next, a preferred embodiment of the core of the golf ball of the present invention will be explained. The core of the golf ball of the present invention includes a single-layered core, a core consisting of a center and a single-layered intermediate layer covering the core, a core consisting of a center and multi-piece or multi-layer of intermediate layers covering the center. The core preferably has a spherical shape. If the core does not have a spherical shape, the cover does not have a uniform thickness. As a result, there exist some portions where the performance of the cover is lowered. On the other hand, the center generally has the spherical shape, but the center may be provided with a rib on the surface thereof so that the surface of the spherical center is divided by the ribs, preferably the surface of the spherical center is evenly divided by the ribs. In one embodiment, the ribs are preferably formed on the surface of the spherical center in an integrated manner, and in another embodiment, the ribs are formed as an intermediate layer on the surface of the spherical center.

The ribs are preferably formed along an equatorial line and meridians that evenly divide the surface of the spherical center, if the spherical center is assumed as the earth. For example, if the surface of the spherical center is evenly divided into 8, the ribs are formed along the equatorial line, any meridian as a standard, and meridians at the longitude 90 degrees east, longitude 90 degrees west, and the longitude 180 degrees east(west), assuming that the meridian as the standard is at longitude 0 degree. If the ribs are formed, the depressed portion divided by the ribs are preferably filled with a plurality of intermediate layers or with a single-layered intermediate layer that fills each of the depressed portions to make a core in the spherical shape. The shape of the ribs, without limitation, includes an arc or an almost arc (for example, a part of the arc is removed to obtain a flat surface at the cross or orthogonal portions thereof).

The core or the center of the golf ball of the present invention, is preferably molded into a spherical shape by, for example, heat-pressing a rubber composition (hereinafter, simply referred to as "core rubber composition" in some cases) containing a base rubber, a crosslinking initiator, a co-crosslinking agent, and where necessary a filler.

As the base rubber, a natural rubber or a synthetic rubber can be used. Such examples include a polybutadiene rubber, a natural rubber, a polyisoprene rubber, a styrene polybutadiene rubber, and ethylene-propylene-diene terpolymer (EPDM). Among them, typically preferred is the high cis-polybutadiene having cis-1,4 bond in a proportion of 40% or more, more preferably 70% or more, even more preferably 90% or more in view of its superior repulsion property.

The crosslinking initiator is blended to crosslink the base rubber component. As the crosslinking initiator, an organic peroxide is preferably used. Examples of the organic peroxide for use in the present invention are dicumyl peroxide, 1,1-bis(t-butylperoxy)-3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. If the amount is less than 0.2 part by mass, the core becomes too soft, and the resilience tends to be lowered, and if the amount is more than 3 parts by mass, the amount of the co-crosslinking agent needs to be increased in order to obtain an appropriate hardness, which may cause the insufficient resilience.

The co-crosslinking agent is not particularly limited, as long as it has the effect of crosslinking a rubber molecule by graft polymerization to a base rubber molecular chain; for example, $\alpha,\beta$-unsaturated carboxylic acid having 3 to 8 carbon atoms or a metal salt thereof, more preferably acrylic acid, methacrylic acid or a metal salt thereof may be used. As the metal constituting the metal salt, for example, zinc, magnesium, calcium, aluminum and sodium may be used, and among them, zinc is preferred because it provides high resilience. The amount of the co-crosslinking agent to be used is preferably 10 parts or more, more preferably 20 parts or more, and is preferably 50 parts or less, more preferably 40 parts or less based on 100 parts of the base rubber by mass. If the amount of the co-crosslinking agent to be used is less than 10 parts by mass, the amount of the organic peroxide must be increased to obtain an appropriate hardness which tends to lower the resilience. On the other hand, if the amount of the co-crosslinking agent to be used is more than 50 parts by mass, the core becomes too hard, so that the shot feeling may be lowered.

The filler contained in the core rubber composition is mainly blended as a gravity adjusting agent in order to adjust the specific gravity of the golf ball obtained as the final product in the range of 1.0 to 1.5, and may be blended as required. Examples of the filler include an inorganic filler such as zinc oxide, barium sulfate, calcium carbonate, magnesium oxide, tungsten powder, and molybdenum powder. The amount of the filler to be blended in the rubber composition is preferably 2 parts or more, more preferably 3 parts or more, and preferably 50 parts or less, more preferably 35 parts or less based on 100 parts of the base rubber by mass. If the amount of the filler to be blended is less than 2 parts by mass, it becomes difficult to adjust the weight, while if it is more than 50 parts by mass, the weight ratio of the rubber component becomes small and the resilience tends to be lowered.

As the core rubber composition, an organic sulfur compound, an antioxidant or a peptizing agent may be blended appropriately in addition to the base rubber, the crosslinking initiator, the co-crosslinking agent and the filler.

As the organic sulfur compound, a diphenyl disulfide or a derivative thereof may be preferably used. Examples of the diphenyl disulfide or the derivative thereof include diphenyl disulfide; a mono-substituted diphenyl disulfide such as bis (4-chlorophenyl)disulfide, bis(3-chlorophenyl)disulfide, bis (4-bromophenyl)disulfide, bis(3-bromophenyl)disulfide, bis (4-fluorophenyl)disulfide, bis(4-iodophenyl)disulfide and bis (4-cyanophenyl)disulfide; a di-substituted diphenyl disulfide such as bis(3,5-dichlorophenyl)disulfide, bis(2,6-dichlorophenyl)disulfide, bis(2,5-dibromophenyl)disulfide, bis(3,5-dibromophenyl)disulfide, bis(2-chloro-5-bromophenyl) disulfide, and bis(2-cyano-5-bromophenyl)disulfide; a tri-substituted diphenyl disulfide such as bis(2,4,6-trichlorophenyl)disulfide, and bis(2-cyano-4-chloro-6-bromophenyl)disulfide; a tetra-substituted diphenyl disulfide such as bis(2,3,5,6-tetra chlorophenyl)disulfide; a penta-substituted diphenyl disulfide such as bis(2,3,4,5,6-pentachlorophenyl)disulfide and bis(2,3,4,5,6-pentabromophenyl)disulfide. These diphenyl disulfides or the derivative thereof can enhance resilience by having some influence on the state of vulcanization of vulcanized rubber. Among them, diphenyl disulfide and bis(pentabromophenyl)disulfide are preferably used, since a golf ball having particularly high resilience can be obtained. The amount of the diphenyl disulfide or the derivative thereof to be blended is preferably 0.1 part by mass or more, more preferably 0.3 part by mass or more, and preferably 5.0 parts by mass or less, more preferably 3.0 parts by mass or less relative to 100 parts by mass of the base rubber.

The amount of the antioxidant to be blended is preferably 0.1 part or more and is preferably 1 part or less based on 100 parts of the base rubber by mass. Further, the amount of the peptizing agent is preferably 0.1 part or more and is preferably 5 parts or less based on 100 parts of the base rubber by mass.

The conditions for press-molding the rubber composition should be determined depending on the rubber composition. The press-molding is preferably carried out for 10 to 60 minutes at the temperature of 130 to 200° C. Alternatively, the press-molding is preferably carried out in a two-step heating, for example, for 20 to 40 minutes at the temperature of 130 to 150° C., and continuously for 5 to 15 minutes at the temperature of 160 to 180° C.

The core used in the golf ball of the present invention preferably has a diameter of 39 mm or larger, more preferably 39.5 mm or larger, and even more preferably 40.8 mm or larger, and preferably has a diameter of 42.2 mm or smaller, more preferably 42 mm or smaller, and even more preferably 41.8 mm or smaller. If the diameter of the core is smaller than the above lower limit, the cover becomes so thick that the resulting golf ball would have reduced resilience. On the other hand, if the diameter of the core is larger than the above upper limit, the cover becomes so thin that it is difficult to mold a cover.

In the case that the core has a diameter of from 39 mm to 42.2 mm, the compression deformation amount (deformation amount along the shrinkage direction) of the core when applying a load from 98 N as an initial load to 1275 N as a final load is preferably 2.50 mm or more, more preferably 2.60 mm or more, and is preferably 3.20 mm or less, and more preferably 3.10 mm or less. If the above deformation amount is less than 2.50 mm, the core becomes too hard, resulting in worsening the shot feeling, while if the above deformation amount is larger than 3.20 mm, the repulsion property may be lowered.

In a preferable embodiment, the core has a hardness difference between the center and the surface. The difference between the surface hardness and the center hardness is preferably 10 or more, more preferably 12 or more, and is preferably 40 or less, more preferably 35 or less, and even more preferably 30 or less in JIS-C hardness. If the hardness difference is more than 40, the durability may be lowered, while if the hardness difference is less than 10, the shot feeling may be hard because of a large impact. The surface hardness of the core is preferably 65 or more, more preferably 70 or more, even more preferably 72 or more, and is preferably 100 or less in JIS-C hardness. If the surface hardness of the core is less than 65 in JIS-C hardness, the core is so soft and the repulsion property may be lowered, resulting in shortening the flight distance. On the other hand, if the surface hardness of the core is more than 100, the core is so hard and the shot feeling may be lowered. The center hardness of the core is preferably 45 or more, more preferably 50 or more, and is preferably 70 or less, and more preferably 65 or less in JIS-C hardness. If the center hardness of the core is less than 45, the core is so soft and the durability may be lowered, while if the center hardness of the core is more than 70, the core is so hard and the shot feeling may be worsened. The hardness difference of the core can be formed by properly selecting the heat molding conditions of the core.

In the case that the golf ball of the present invention is a three-piece golf ball or a multi-piece golf ball, examples of the material for the intermediate layer are a thermoplastic polyamide elastomer having a commercial name of "Pebax (registered trademark) (e.g. Pebax 2533)" available from Arkema; a thermoplastic polyester elastomer having a commercial name of "Hytrel (registered trademark) (e.g. Hytrel 3548, Hytrel 4047)" available from Du Pont-Toray Co., Ltd.; a thermoplastic polyurethane elastomer having a commercial name of "Elastollan (registered trademark) (e.g. Elastollan XNY97A)" available from BASF Japan Co., a thermoplastic polystyrene elastomer having a commercial name of "Rabalon (registered trademark) (e.g. Rabalon SR04, Rabalon T3339C, Rabalon T3221C)" available from Mitsubishi Chemical Corporation, in addition to the cured product of the rubber composition or the conventional ionomer resin. The intermediate layer may further contain a gravity adjusting agent such as barium sulfate, tungsten or the like, an antioxidant, and a pigment or the like.

In the case of using the intermediate layer composition containing a rubber composition as a main component (50 mass % or more), the intermediate layer preferably has a thickness of 1.2 mm or more, more preferably 1.8 mm or more, even more preferably 2.4 mm or more, and preferably has a thickness of 6.0 mm or less, more preferably 5.2 mm or less, even more preferably 4.4 mm or less.

In the case of using the intermediate layer composition containing the resin composition as a main component (50 mass % or more), the intermediate layer preferably has a thickness of 0.3 mm or more, more preferably 0.4 mm or more, even more preferably 0.5 mm or more, and preferably has a thickness of 2.5 mm or less, more preferably 2.4 mm or less, even more preferably 2.3 mm or less. If the thickness of the intermediate layer is more than 2.5 mm, the resilience performance of the obtained golf ball may be lowered, while if the thickness of the intermediate layer is less than 0.3 mm, it may be difficult to suppress the excessive spin rate on the driver shot.

The intermediate layer of the golf ball of the present invention preferably has a slab hardness of 50 or larger, more preferably 52 or larger, and even more preferably 54 or larger, and preferably has a slab hardness of 75 or smaller, more preferably 73 or smaller, and even more preferably 71 or smaller in Shore D hardness. The intermediate layer having the slab hardness of 50 or more in shore D hardness makes the core have the higher degree of "hard outer and soft inner" structure, thereby providing a high launch angle and a less amount of spin and hence achieving a large flight distance of the gold ball. On the other hand, the intermediate layer having the slab hardness of 75 or less in shore D hardness provides an excellent shot feeling as well as improves the spin performance of the golf ball, thereby improving controllability of the golf ball. Herein, the slab hardness of the intermediate layer is the measured hardness of the intermediate layer composition in the form of a sheet, and is measured by a later-described measuring method. The slab hardness of the intermediate layer can be adjusted, for example, by appropriately selecting a combination of the above resin component and the rubber material and the amount of additives.

An embodiment for molding the intermediate layer is not particularly limited, and includes an embodiment which comprises injection molding the intermediate layer composition directly onto the center, or an embodiment which comprises molding the intermediate layer composition into a half hollow-shell, covering the center with the two hollow-shells and subjecting the center with the two hollow shells to the compression-molding at the temperature of 130° to 170° for 1 to 5 minutes.

When preparing a wound golf ball in the present invention, a wound core may be used as the core. In that case, for example, a wound core comprising a center formed by curing the above rubber composition for the core and a rubber thread layer which is formed by winding a rubber thread around the center in an elongated state can be used. In the present invention, the rubber thread, which is conventionally used for winding around the center, can be adopted for winding around the center. The rubber thread, for example, is obtained by vulcanizing a rubber composition including a natural rubber, or a mixture of a natural rubber and a synthetic polyisoprene, a sulfur, a vulcanization auxiliary agent, a vulcanization accelerator, and an antioxidant. The rubber thread is wound around the center in elongation of about 10 times length to form the wound core.

Figure 1:
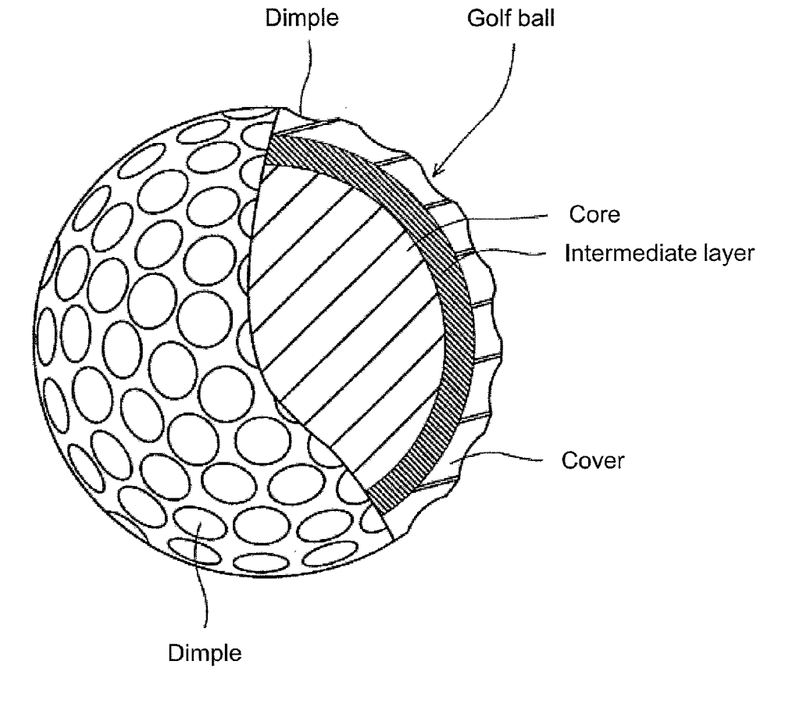
FIG. 1 shows a partially cut away schematic representation of a golf ball in accordance with the present invention.

The golf ball of the present invention is not particularly limited on a structure thereof as long as the golf ball includes a core and a cover. Examples of the golf ball of the present invention include a two-piece golf ball including a core, and a cover covering the core; a three-piece golf ball including a core consisting of a center and an intermediate layer covering the center, and a cover covering the core, as illustrated in FIG. 1; a multi-piece golf ball including a core consisting of a center and a multi-piece or multi-layer of intermediate layers covering the center, and a cover covering the core; and a wound golf ball including a wound core, and a cover covering the wound core.

EXAMPLES

The following examples illustrate the present invention, however these examples are intended to illustrate the invention and are not to be construed to limit the scope of the present invention. Many variations and modifications of such examples will exist without departing from the scope of the inventions. Such variations and modifications are intended to be within the scope of the invention.

[Evaluation Methods]
(1) Abrasion-Resistance

A commercially available sand wedge (available from SRI sports limited, S shaft) was installed on a swing robot available from Golf Laboratories, Inc., and two points of a ball were both hit once at a head speed of 36 m/sec to observe the portions which were hit. Each hit portion was evaluated and ranked into eight levels based on the following criteria, and an average rank score for the two points was calculated. A smaller score indicates higher abrasion-resistance.

0 point: No hitting marks were observed.
1 point: Dot-like peeling (a maximum size is smaller than 3 mm) was observed.
2 point: Dot-like peeling (a maximum size is 3 mm or larger) was observed.
3 point: Line-like peeling (a maximum size is 5 mm or larger) was observed.
4 point: Clear line-like peeling (a maximum size is 5 mm or larger) was observed.
5 point: Deep and wide line-like peeling (a maximum size is 5 mm or larger) was observed.
6 point: Deep and wide peeling which was almost a plane was observed.
7 point: A part of the cover was scraped away as a plane.

(2) Spin Rate

An approach wedge (SRIXON I-302 available from SRI Sports Limited) was installed on a swing robot available from Golf Laboratories, Inc. A golf ball was hit at a head speed of 21 m/sec., and a sequence of photographs of the hit golf ball were taken for measuring the spin rate (rpm). The measurement was performed ten times for each golf ball, and the average value is regarded as the spin rate (rpm).

(3) Slab Hardness (Shore D Hardness)

Sheets having a thickness of about 2 mm were prepared from the cover composition or the intermediate layer composition by hot press molding and preserved at the temperature of 23° C. for two weeks. Three or more of the sheets were stacked on one another to avoid being affected by the measuring substrate on which the sheets were placed, and the stack was subjected to the measurement using a P1 type auto hardness tester provided with the Shore D type spring hardness tester prescribed by ASTM-D2240, available from KOUBUNSHI KEIKI CO., LTD to obtain the respective slab hardness of the cover composition or the intermediate layer composition.

(4) Core Hardness (JIS-C)

The hardness measured at a surface part of a spherical core using a JIS-C type spring hardness tester specified by JIS K6301, was determined as the surface hardness of the spherical core, and the JIS-C hardness obtained by cutting a spherical core into halves and measuring at the center of the cut surface was determined as the center hardness of the spherical core.

[Production of the Golf Ball]
(1) Preparation of the Center

The center rubber compositions having formulation shown in Table 1 were kneaded and pressed in upper and lower molds, each having a hemispherical cavity, at a temperature of 170° C. for 15 minutes to obtain the center with a spherical shape.

TABLE 1

| Center composition | A | B |
|---|---|---|
| Polybutadiene rubber | 100 | 100 |
| Zinc acrylate | 35 | 38 |
| Zinc oxide | 5 | 5 |
| Diphenyl disulfide | 0.5 | 0.5 |
| Dicumyl peroxide | 1 | 1 |

Notes on table 1:
Parts by mass
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Dicumyl peroxide: Percumyl D manufactured by NOF Corporation
Diphenyl disulfide: manufactured by Sumitomo Seika Chemicals Company Limited (2) Preparation of Core
Core Nos. 1 to No. 4, No. 6 to No. 8

Next, the materials for the intermediate layer shown in Table 2 were mixed by a twin-screw kneading extruder to prepare an intermediate layer composition in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder. The obtained intermediate layer composition was injection molded on the center which had been obtained as described above, to prepare a core consisting of the center and the intermediate layer covering the center.

Core No. 5

The intermediate layer composition was first kneaded and the upper die for molding a center in the state that the center was set therein and a lower die for molding a core were clamped in a manner that a necessary amount of the intermediate layer composition was brought into contact with a half of the surface of the center and heat pressing was carried out to produce an intermediate core molded product having an intermediate layer formed on a half of the surface of the center. Next, the lower die for molding the core in the state that the intermediate layer of the intermediate core molded product was housed and an upper die for molding a core were clamped in a manner that a necessary amount of the intermediate layer composition was brought into contact with the other half of the surface of the center and heat pressing was carried out to produce a core having an intermediate layer on the other half of the surface of the center.

Core No. 9

The center was used as the core.

(Measuring Conditions of Gas Chromatography)

Column: DB-1 (available from Shimadzu Corporation), 30 m×0.25 mm×0.25 μm.

Temperature: Kept at 150° C. for 2 minutes, then raised to 250° C. at the rate of 5° C./min, then raised to 300° C. at the rate of 10° C./min, and kept at 300° C. for 3 minutes.

Injection temperature: 280° C.

Detector temperature: 280° C.

Carrier gas: helium (at flow rate of 2 ml/min.)

[Synthesis of the Polyurethane]

To have the compositions as shown in Table 3 and 4, first, PTMG2000 heated at the temperature of 80° C. was added to MDI heated at the temperature of 80° C. Then, dibutyl tin dilaurate (dibutyl tin dilaurate available from Aldrich, Inc.) of 0.005 mass % of the total amount of the raw materials (MDI, PTMG2000, and Chain extender) was added thereto. Then, the mixture was stirred at the temperature of 80° C. for 2 hours under a nitrogen gas flow. Under a nitrogen gas flow, the

TABLE 2

|  |  | Core No. | | | | | | | | |
|---|---|---|---|---|---|---|---|---|---|---|
|  |  | 1 | 2 | 3 | 4 | 5 | 6 | 7 | 8 | 9 |
| Center | Center composition | A | A | A | A | A | A | A | A | B |
|  | Center diameter (mm) | 38.5 | 38.5 | 38.5 | 39.7 | 36.7 | 38.9 | 37.5 | 35.5 | 41.7 |
| Intermediate layer | Intermediate layer composition | a | b | c | d | e | f | g | h | — |
|  | Himilan 1605 | 50 | 40 | — | 50 | — | 50 | 50 | 50 | — |
|  | Himilan AM7329 | 50 | 35 | — | 50 | — | 50 | 50 | 50 | — |
|  | Rabalon T3221C | — | 25 | — | — | — | — | — | — | — |
|  | Surlyn 8140 | — | — | 50 | — | — | — | — | — | — |
|  | Surlyn 9120 | — | — | 50 | — | — | — | — | — | — |
|  | Polybutadiene | — | — | — | — | 100 | — | — | — | — |
|  | Zinc acrylate | — | — | — | — | 40 | — | — | — | — |
|  | Zinc oxide | — | — | — | — | 5 | — | — | — | — |
|  | Diphenyl disulfide | — | — | — | — | 0.5 | — | — | — | — |
|  | Dicumyl peroxide | — | — | — | — | 1 | — | — | — | — |
|  | Slab hardness (Shore D) | 64 | 50 | 69 | 64 | 60 | 64 | 64 | 64 | — |
|  | Thickness (mm) | 1.6 | 1.6 | 1.6 | 1 | 2.5 | 1.6 | 1.6 | 1.6 | — |
| Core Property | Diameter (mm) | 41.7 | 41.7 | 41.7 | 41.7 | 41.7 | 42.1 | 40.7 | 38.7 | 41.7 |
|  | Surface hardness (JIS-C) | 98 | 80 | 99 | 98 | 88 | 98 | 98 | 98 | 86 |
|  | Center hardness (JIS-C) | 65 | 65 | 65 | 65 | 65 | 65 | 65 | 65 | 67 |
|  | Hardness difference (JIS-C) | 33 | 15 | 34 | 33 | 23 | 33 | 33 | 33 | 19 |
|  | Compression deformation amount (mm) | 2.55 | 2.75 | 2.45 | 2.7 | 2.35 | 2.55 | 2.55 | 2.5 | 2.6 |

Formulation: parts by mass

Notes on table 2:

Himilan 1605:سodium ion neutralized ethylene-methacrylic acid copolymerized ionomer resin manufactured by MITSUI-DUPONT POLYCHEMICAL CO., LTD.
Himilan AM7329: zinc ion neutralized ethylene-methacrylic acid copolymerized ionomer resin manufactured by MITSUI-DUPONT POLYCHEMICAL CO., LTD.
Rabalon T3221C: Thermoplastic polystyrene elastomer available from Mitsubishi Chemical Corporation.
SURLYN 8140: a sodium ion neutralized ethylene-methacrylic acid copolymer ionomer resin available from E.I. du Pont de Nemours and Company.
SURLYN 9120: a zinc ion neutralized ethylene-methacrylic acid copolymer ionomer resin available from E.I. du Pont de Nemours and Company.
Polybutadiene rubber: BR730 (high cis-polybutadiene) manufactured by JSR Corporation
Zinc acrylate: ZNDA-90S manufactured by NIHON JYORYU KOGYO Co,. LTD.
Zinc oxide: Ginrei R manufactured by Toho-Zinc Co.
Dicumyl peroxide: Percumyl D manufactured by NOF Corporation
Diphenyl disulfide: manufactured by Sumitomo Seika Chemicals Company Limited (3) Preparation of Cis-Trans Mixture The cis-trans mixtures were prepared by mixing 1,4-cyclohexane dimethanol (cis/trans mass ratio=74/26) and 1,4-cyclohexane dimethanol (cis/trans mass ratio=0/100), available from TOKYO CHEMICAL INDUSTRY Co., Ltd, based on the mixing ratio shown in Table 3 and 4. The mixing ratio of cis-trans mixture can be measured using gas chromatography equipment under the following conditions.

cis-trans mixture heated at the temperature of 80° C. was added as a chain extender to the mixture, and the mixture was stirred at the temperature of 80° C. for 1 minute. Then, the reaction liquid was cooled, and degassed under the reduced pressure for 1 minute at the room temperature. After the degassing, the reaction liquid was spread in a container, kept at the temperature of 110° C. for 6 hours under a nitrogen gas atmosphere to carry out a chain extending reaction, thereby obtaining polyurethanes.

TABLE 3

| | | | Golf ball No. | | | | | | | | |
|---|---|---|---|---|---|---|---|---|---|---|---|
| | | | 1 | 2 | 3 | 4 | 5 | 6 | 7 | 8 | 9 |
| Core | No. | | 1 | 1 | 1 | 1 | 1 | 1 | 1 | 1 | 1 |
| | Intermediate layer hardness | Shore D | 64 | 64 | 64 | 64 | 64 | 64 | 64 | 64 | 64 |
| | Intermediate layer thickness | mm | 1.6 | 1.6 | 1.6 | 1.6 | 1.6 | 1.6 | 1.6 | 1.6 | 1.6 |
| | Core Diameter | mm | 41.7 | 41.7 | 41.7 | 41.7 | 41.7 | 41.7 | 41.7 | 41.7 | 41.7 |
| Cover composition | Polyurethane | Parts by mass | | | | | 100 | | | | |
| | Constituting component | M.W. | | | | | Molar ratio | | | | |
| | PTMG2000 | 2000 | 1 | 1 | 1 | 1 | 1 | 1 | 1 | 1 | 1 |
| | MDI | 250 | 4 | 4 | 4 | 4 | 4 | 4 | 4 | 4 | 4 |
| | CHDM | 144 | 3 | 3 | 3 | 3 | 3 | 3 | 3 | 3 | — |
| | BD | 90 | — | — | — | — | — | — | — | — | 3 |
| | Cis/Trans ratio | mass ratio | 70/30 | 60/40 | 50/50 | 40/60 | 30/70 | 20/80 | 10/90 | 0/100 | 0 |
| | Slab hardness of polyurethane | Shore D | 38 | 38 | 39 | 39 | 40 | 42 | 44 | 48 | 36 |
| | Titanium oxide | Parts by mass | | | | | 4 | | | | |
| | Cover thickness | mm | 0.5 | 0.5 | 0.5 | 0.5 | 0.5 | 0.5 | 0.5 | 0.5 | 0.5 |
| | Slab hardness | Shore D | 39 | 39 | 40 | 40 | 41 | 43 | 45 | 49 | 37 |
| Property | Abrasion-resistance | | 1 | 1 | 1 | 1 | 1 | 2 | 3 | 6 | 6 |
| | Spin performance (rpm) | | 6400 | 6800 | 6900 | 7000 | 7000 | 7000 | 7000 | 7000 | 7000 |

Formulation of polyurethane: molar ratio
Formulation of cover composition: parts by mass
M.W.: molecular weight

TABLE 4

| | | | Golf ball No. | | | | | | | | | |
|---|---|---|---|---|---|---|---|---|---|---|---|---|
| | | | 10 | 11 | 12 | 13 | 14 | 15 | 16 | 17 | 18 | 19 |
| Core | No. | | 1 | 1 | 6 | 7 | 8 | 9 | 2 | 3 | 4 | 5 |
| | Intermediate layer hardness | Shore D | 64 | 64 | 64 | 64 | 64 | — | 50 | 69 | 64 | 60 |
| | Intermediate layer thickness | mm | 1.6 | 1.6 | 1.6 | 1.6 | 1.6 | — | 1.6 | 1.6 | 1 | 2.5 |
| | Core Diameter | mm | 41.7 | 41.7 | 42.1 | 40.7 | 38.7 | 41.7 | 41.7 | 41.7 | 41.7 | 41.7 |
| Cover composition | Polyurethane | Parts by mass | | | | | 100 | | | | | |
| | Constituting component | M.W. | | | | | Molar ratio | | | | | |
| | PTMG2000 | 2000 | 1 | 1 | 1 | 1 | 1 | 1 | 1 | 1 | 1 | 1 |
| | MDI | 250 | 2.2 | 5.5 | 4 | 4 | 4 | 4 | 4 | 4 | 4 | 4 |
| | CHDM | 144 | 1.2 | 4.5 | 3 | 3 | 3 | 3 | 3 | 3 | 3 | 3 |
| | BD | 90 | — | — | — | — | — | — | — | — | — | — |
| | Cis/Trans ratio | mass ratio | 30/70 | 30/70 | 30/70 | 30/70 | 30/70 | 30/70 | 30/70 | 30/70 | 30/70 | 30/70 |
| | Slab hardness of polyurethane | Shore D | 19 | 49 | 40 | 40 | 40 | 40 | 40 | 40 | 40 | 40 |
| | Titanium oxide | Parts by mass | | | | | 4 | | | | | |
| | Cover thickness | mm | 0.5 | 0.5 | 0.3 | 1.0 | 2.0 | 0.5 | 0.5 | 0.5 | 0.5 | 0.5 |
| | Slab hardness | Shore D | 20 | 50 | 41 | 41 | 41 | 41 | 41 | 41 | 41 | 41 |
| Property | Abrasion-resistance | | 1 | 1 | 1 | 0.5 | 0.5 | 0.5 | 0.5 | 1 | 1 | 1 |
| | Spin performance (rpm) | | 8000 | 5500 | 6900 | 7300 | 7400 | 7500 | 7300 | 6900 | 7400 | 7300 |

Formulation of polyurethane: molar ratio,
Formulation of cover composition: parts by mass
M.W.: molecular weight Materials in Tables 3 and 4:
MDI: Sumidur 44S available from Sumika Bayer Urethane Co., Ltd.
PTMG2000: Polytetramethylene ether glycol, PTMG-2000SN (Number average molecular weight 2000) available from HODOGAYA CHEMICAL Co., Ltd.
CHDM: 1,4-cyclohexane dimethanol available from TOKYO CHEMICAL INDUSTRY Co., Ltd
BD: 1,4-butanediol available from WAKO Pure Chemicals, Industries, Ltd.

(5) Formulating of Cover Compositions

The cover materials shown in Tables 3 and 4 were mixed by a twin-screw kneading extruder to prepare cover compositions in the form of pellet. Extrusion was performed in the following conditions: screw diameter=45 mm; screw revolutions=200 rpm; and screw L/D=35. The mixtures were heated to a temperature ranging from 150° C. to 230° C. at a die position of the extruder.

(6) Molding of Half Shells

Compression molding of half shells were performed by, charging one pellet of the cover composition obtained as described above into each of depressed parts of lower molds for molding half shells, and applying pressure to mold half shells. Compression molding was performed at a temperature of 180° C. for 5 minutes under a molding pressure of 2.94 MPa.

(7) Molding of the Cover

The core obtained in (2) was covered with the two half shells obtained in (6) in a concentric manner, and the cover was molded by compression molding. Compression molding was performed at a temperature of 150° C. for 2 minutes under a molding pressure of 9.8 MPa. The surface of the obtained golf ball body was subjected to a sandblast treatment, and marking, and then clear paint was applied thereto and dried in an oven at a temperature of 40° C. to obtain a golf ball having a diameter of 42.7 mm and a weight of 45.3 g. Abrasion-resistance and spin performance of the obtained golf ball were evaluated, and results thereof are shown in Tables 3 and 4.

Golf balls No. 1 to 7 are the cases where the cover contains polyurethane as a resin component, wherein the polyurethane has, as a constituting component, a polyisocyanate component, a high-molecular weight polyol component, and a mixture of cis-1,4-cyclohexane dimethanol and trans-1,4-cyclohexane dimethanol as a chain extender. The results indicated that the abrasion-resistance is improved compared with the golf ball No. 8 using only trans-1,4-cyclo-hexane dimethanol and the golf ball No. 9 using 1,4-butanediol as a chain extender. Especially, if the mixing ratio (cis/trans) of cis-structure to trans-structure falls within the range from 60/40 to 30/70, both of the abrasion-resistance and the spin performance were achieved at the higher level. The comparison of the golf ball No. 10 and the golf ball No. 11 indicated that the spin performance was improved by lowering the slab hardness of the cover. The comparison of the golf ball No. 5, and Nos. 12 to 14 indicated that the spin performance and the abrasion-resistance were improved by using the thicker cover.

The present invention can be suitably applied to the golf ball having a cover, and especially suitable for the improvement of the abrasion-resistance and the spin performance of the cover using the polyurethane as a resin component. This application is based on Japanese Patent application No. 2009-154726 filed on Jun. 30, 2009, the contents of which are hereby incorporated by reference.

What is claimed is:

1. A golf ball comprising:
   a core; and
   a cover covering the core and containing polyurethane as a resin component, wherein the polyurethane has a straight chain structure and has, as a constituting component, a polyisocyanate component, a high-molecular weight polyol component, and a mixture of cis-1,4-cyclohexane dimethanol and trans-1,4-cyclohexane dimethanol as a chain extender, and wherein said cover has a shore D hardness ranging from 20 to 48.

2. The golf ball according to claim 1, wherein a mixing ratio of cis-1,4-cyclohexane dimethanol to trans-1,4-cyclohexane dimethanol falls within a range from 10/90 to 70/30 in a mass ratio.

3. The golf ball according to claim 1, wherein a mixing ratio of cis-1,4-cyclohexane dimethanol to trans-1,4-cyclohexane dimethanol falls within a range from 30/70 to 40/60 in a mass ratio.

4. The golf ball according to claim 1, wherein the polyurethane contains diphenylmethane diisocyanate as the polyisocyanate component.

5. The golf ball according to claim 1, wherein the polyurethane contains polyoxytetramethyleneglycol as the high-molecular weight polyol component.

6. The golf ball according to claim 1, wherein the cover has a thickness ranging from 0.3 mm to 2.5 mm.

7. The golf ball according to claim 1, wherein the core is a multi-layered core having a center and at least one intermediate layer covering the center.

8. The golf ball according to claim 7, wherein the intermediate layer has a hardness ranging from 50 to 75 in Shore D hardness.

9. The golf ball according to claim 7, wherein the intermediate layer has a thickness ranging from 0.3 mm to 6.0 mm.

10. The golf ball according to claim 1, wherein the core has a hardness difference between a surface hardness and a center hardness ranging from 10 to 40 in JIS-C hardness.

11. The golf ball according to claim 1, wherein the high-molecular weight polyol has a number average molecular weight of more than 400 and 10,000 or less.

12. The golf ball according to claim 1, wherein the high-molecular weight polyol has a hydroxyl value of 500 mgKOH/g or less.

13. The golf ball according to claim 1, wherein the polyurethane has a hardness ranging from 15 to 50 in Shore D hardness.

14. The golf ball according to claim 1, wherein the polyurethane is obtained by a reaction of the polyisocyanate component, the high-molecular weight polyol and the chain extender in a molar ratio (NCO/OH) of an isocyanate group (NCO) contained in the polyisocyanate component to a hydroxyl group (OH) contained in the high-molecular weight polyol component ranging from 1 to 10.

15. The golf ball according to claim 1, wherein the polyurethane is obtained by a reaction of the polyisocyanate component, the high-molecular weight polyol and the chain extender in a molar ratio (NCO/OH) of an isocyanate group (NCO) contained in an isocyanate group terminated urethane prepolymer to a hydroxyl group (OH) contained in the chain extender ranging from 0.9 to 1.1.

16. A golf ball comprising:
   a core; and
   a cover covering the core and containing polyurethane as a resin component, wherein the polyurethane has a straight chain structure and has, as a constituting component, a polyisocyanate component, a high-molecular weight polyol component, and a mixture of cis-1,4-cyclohexane dimethanol and trans-1,4-cyclohexane dimethanol as a chain extender,
   wherein a mass ratio of cis-1,4-cyclohexane dimethanol to trans-1,4-cyclohexane dimethanol in said cover falls within a range from 10/90 to 70/30, and
   wherein said cover has a shore D hardness ranging from 20 to 48.

17. The golf ball according to claim 16, wherein the polyurethane contains diphenylmethane diisocyanate as the polyisocyanate component and polyoxytetramethyleneglycol as the high-molecular weight polyol component, and the polyurethane has a hardness ranging from 15 to 50 in Shore D hardness.

18. The golf ball according to claim 17, wherein the core is a multi-layered core having a center and at least one intermediate layer covering the center, and said intermediate layer has a thickness ranging from 0.3 mm to 6.0 mm and a Shore D hardness ranging from 50 to 75.

19. The golf ball according to claim 18, wherein a mixing ratio of cis-1,4-cyclohexane dimethanol to trans-1,4-cyclohexane dimethanol falls within a range from 30/70 to 40/60 in a mass ratio.

20. The golf ball according to claim 18, wherein a mixing ratio of cis-1,4-cyclohexane dimethanol to trans-1,4-cyclohexane dimethanol falls within a range from 40/60 to 70/30 in a mass ratio.

21. The golf ball according to claim 1, wherein a mixing ratio of cis-1,4-cyclohexane dimethanol to trans-1,4-cyclohexane dimethanol falls within a range from 40/60 to 70/30 in a mass ratio.

* * * * *